(No Model.) 7 Sheets—Sheet 1.

W. L. GREGG.
BRICK MACHINE.

No. 354,129. Patented Dec. 14, 1886.

Witnesses:
Inventor:

(No Model.)

7 Sheets—Sheet 2.

W. L. GREGG.
BRICK MACHINE.

No. 354,129.

Patented Dec. 14, 1886.

Witnesses:

Inventor:

(No Model.) 7 Sheets—Sheet 3.

W. L. GREGG.
BRICK MACHINE.

No. 354,129. Patented Dec. 14, 1886.

Witnesses: Inventor (No Model.) 7 Sheets—Sheet 5.

W. L. GREGG.
BRICK MACHINE.

No. 354,129. Patented Dec. 14, 1886.

Witnesses:
J. R. Massey
Frank H. Massey

Inventor:
William Lampo Gregg (No Model.) W. L. GREGG. 7 Sheets—Sheet 6.
BRICK MACHINE.
No. 354,129. Patented Dec. 14, 1886.
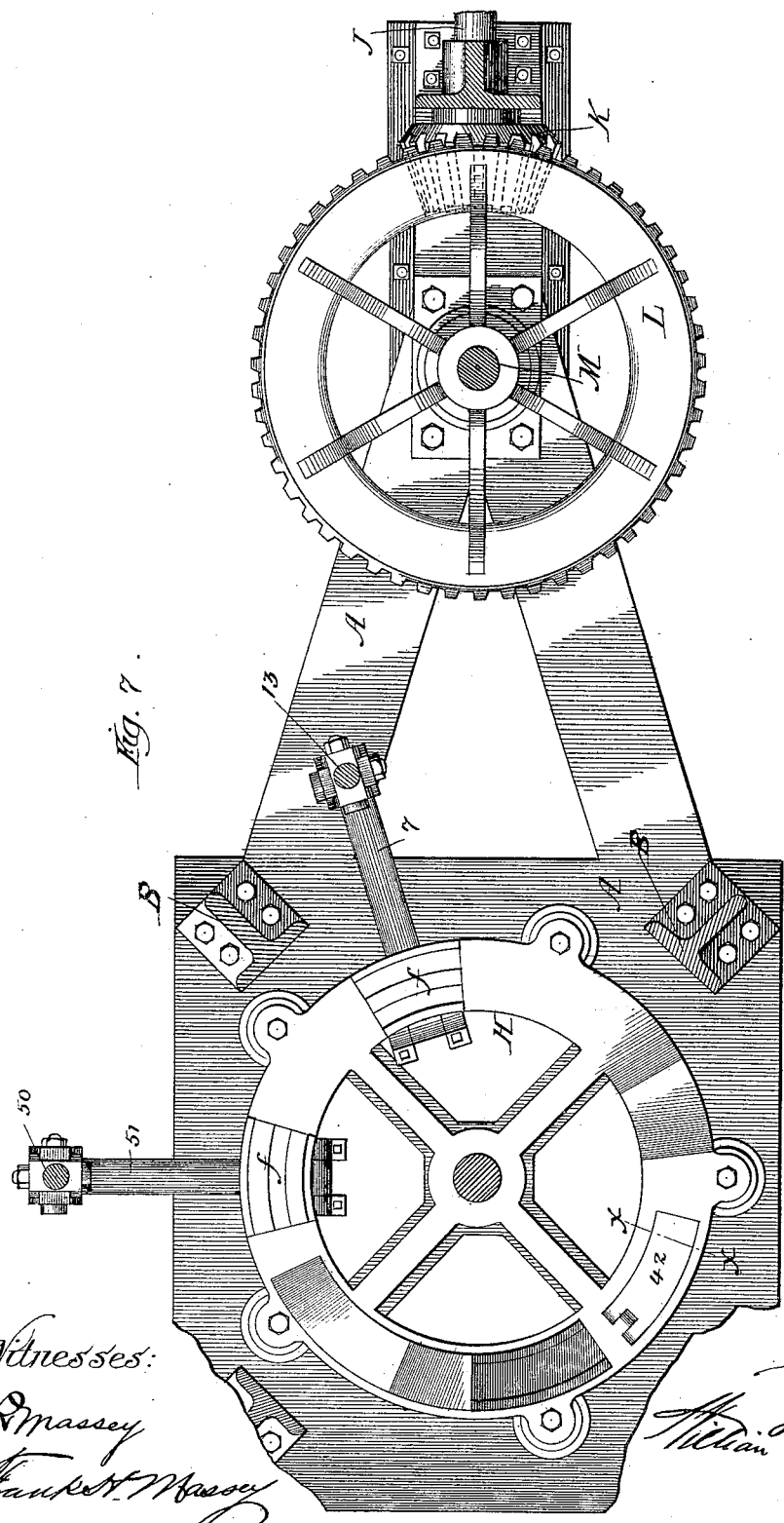

(No Model.) 7 Sheets—Sheet 7.
W. L. GREGG.
BRICK MACHINE.
No. 354,129. Patented Dec. 14, 1886.
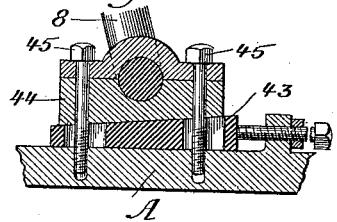
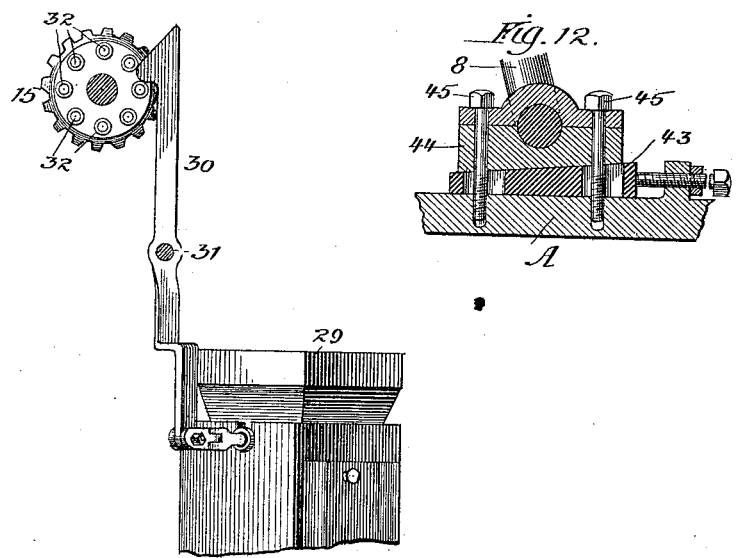
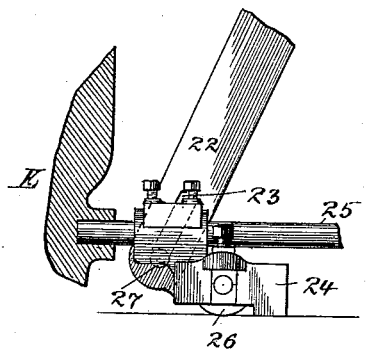
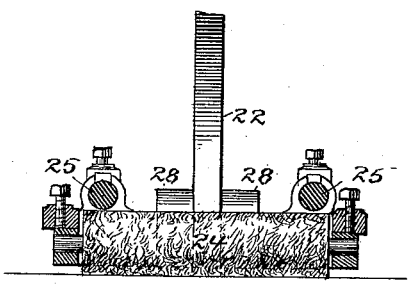
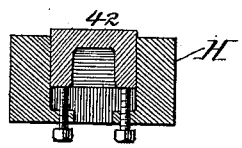
Witnesses:
J. R. Massey
Frank H. Massey
Inventor:
William Layh Gregg

UNITED STATES PATENT OFFICE.

WILLIAM LAMPAS GREGG, OF PHILADELPHIA, PENNSYLVANIA.

BRICK-MACHINE.

SPECIFICATION forming part of Letters Patent No. 354,129, dated December 14, 1886.

Application filed June 22, 1886. Serial No. 205,914. (No model.)

*To all whom it may concern:*

Be it known that I, WILLIAM LAMPAS GREGG, residing at Philadelphia, in the county of Philadelphia and State of Pennsylvania, and a citizen of the United States, have invented a new and useful Improvement in Brick-Machines, of which the following is a full description, reference being had to the accompanying drawings, in which—

Figure 1:
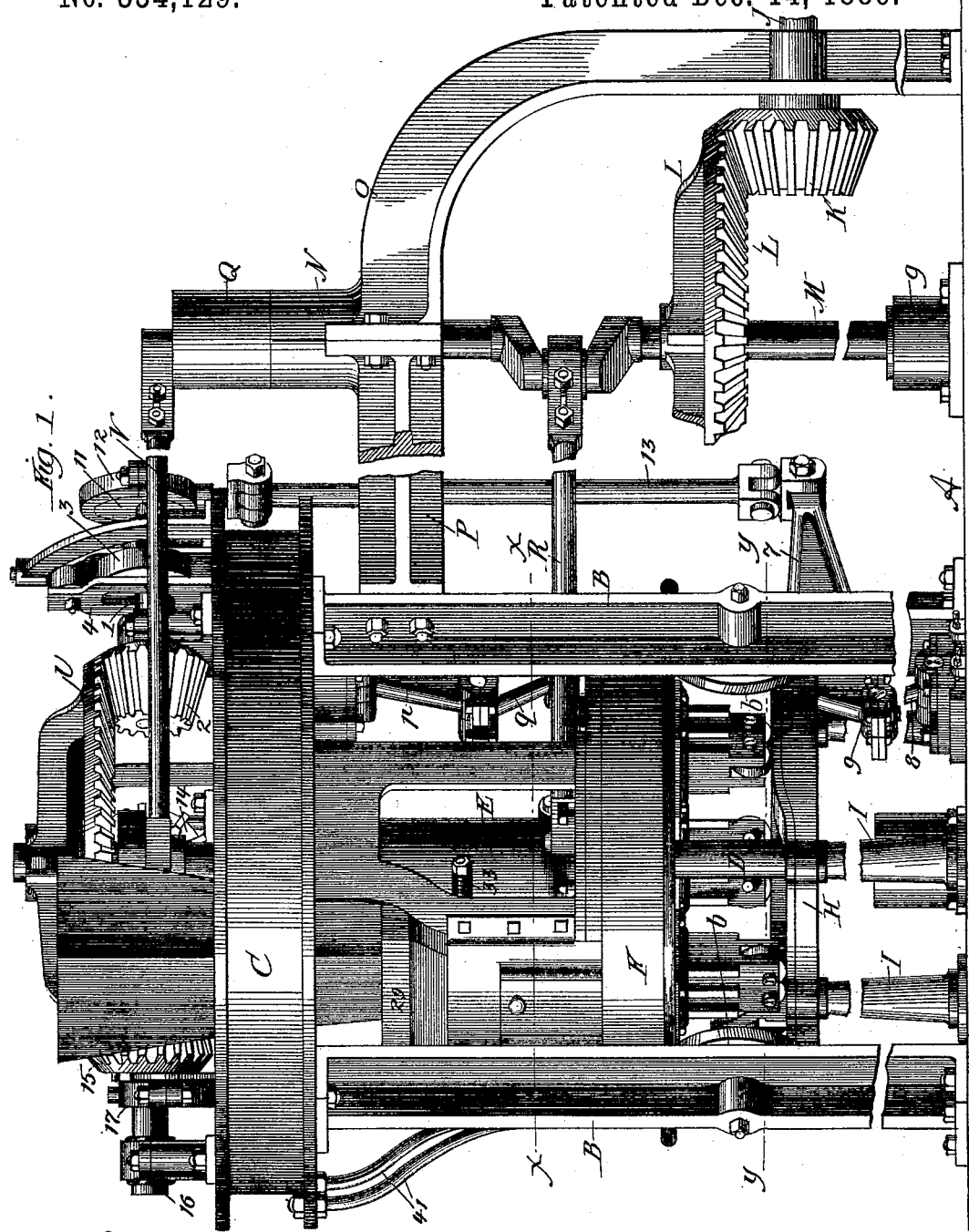
Figure 2:
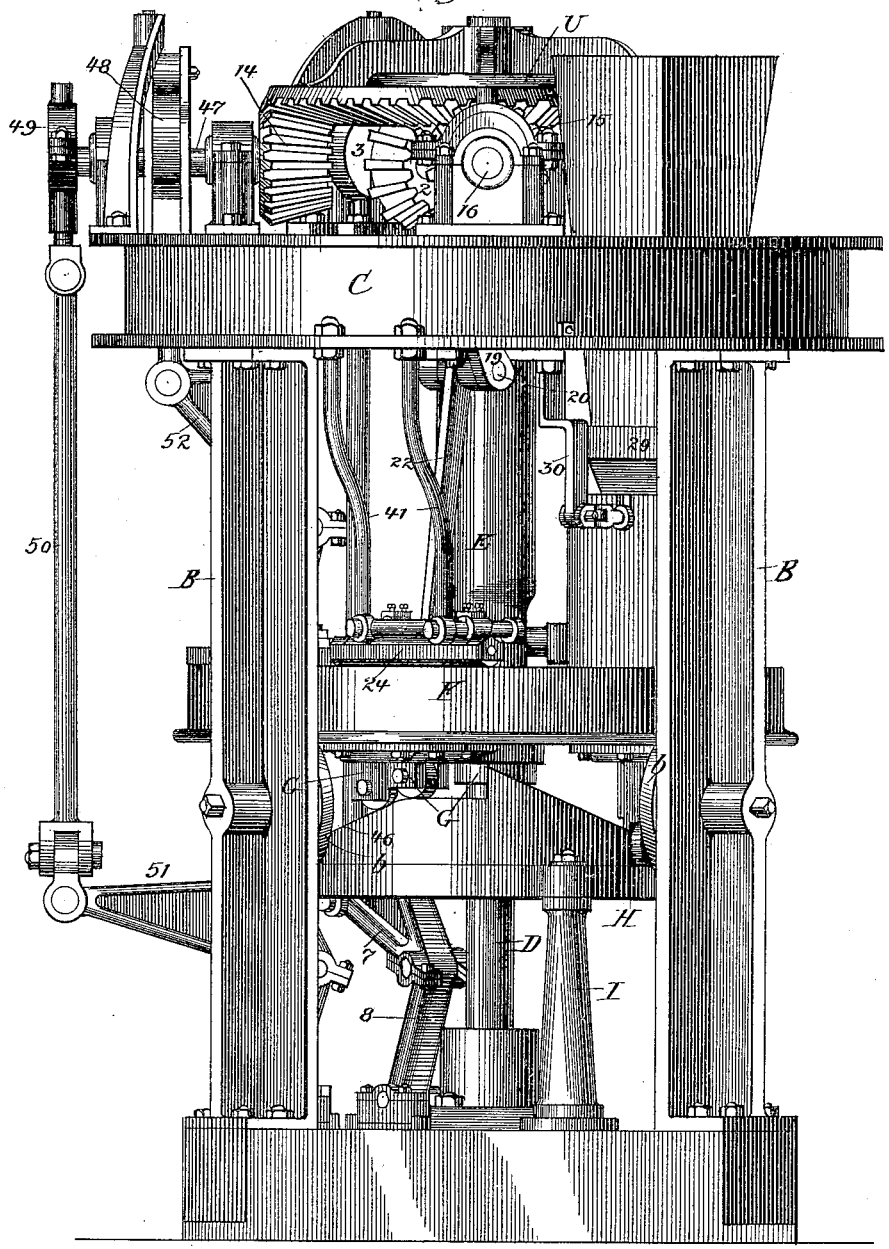
Figure 3:
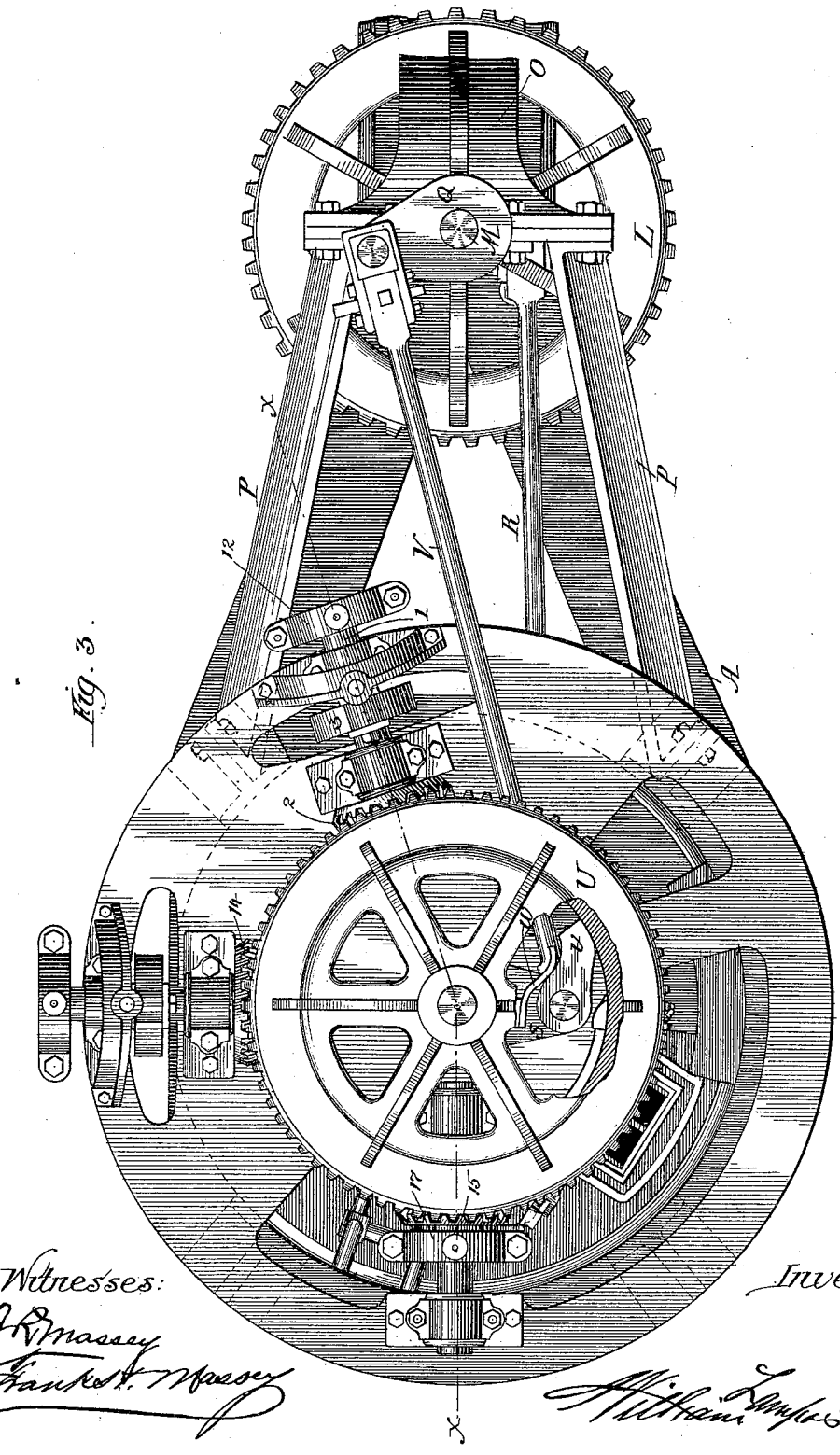
Figure 4:
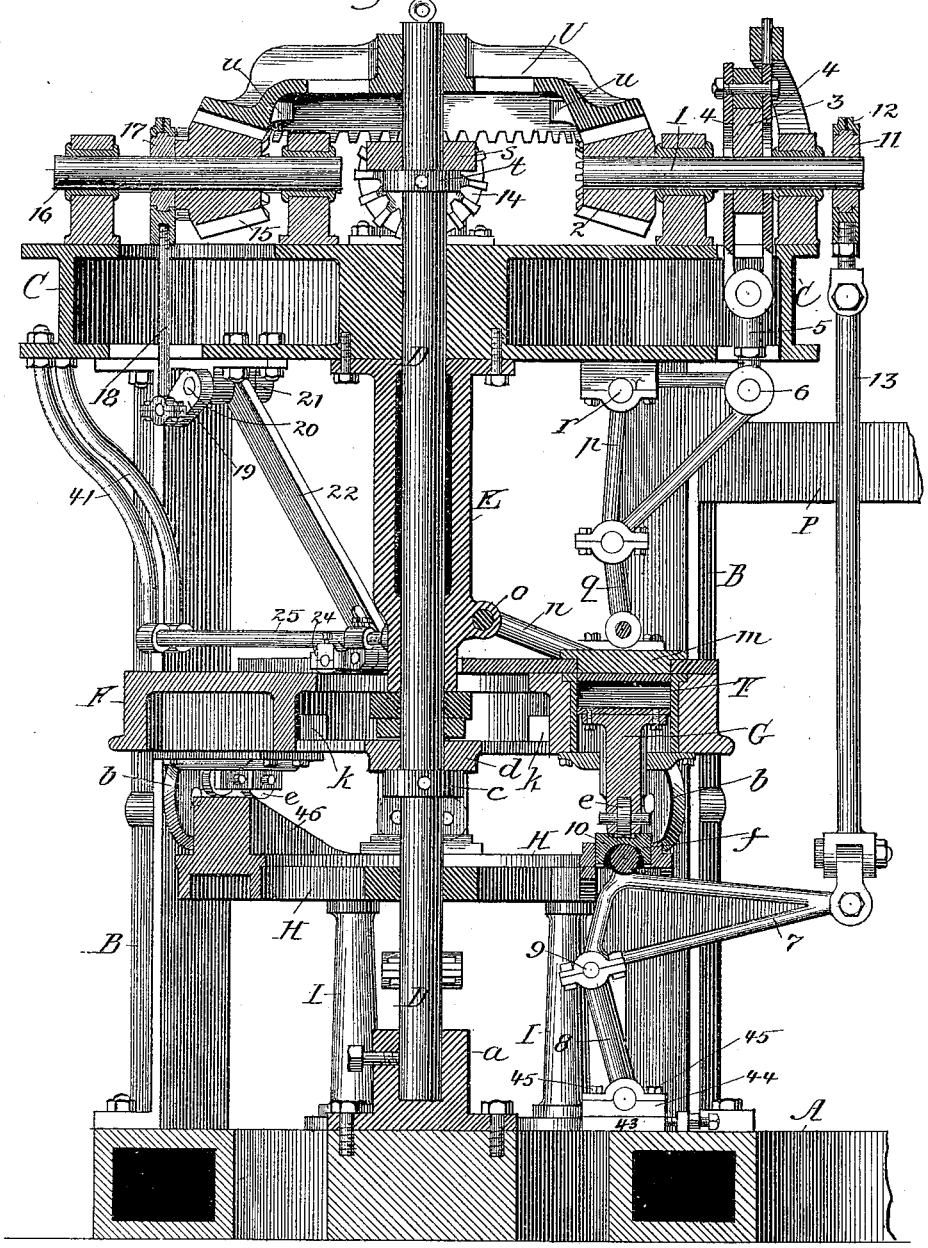
Figure 5:
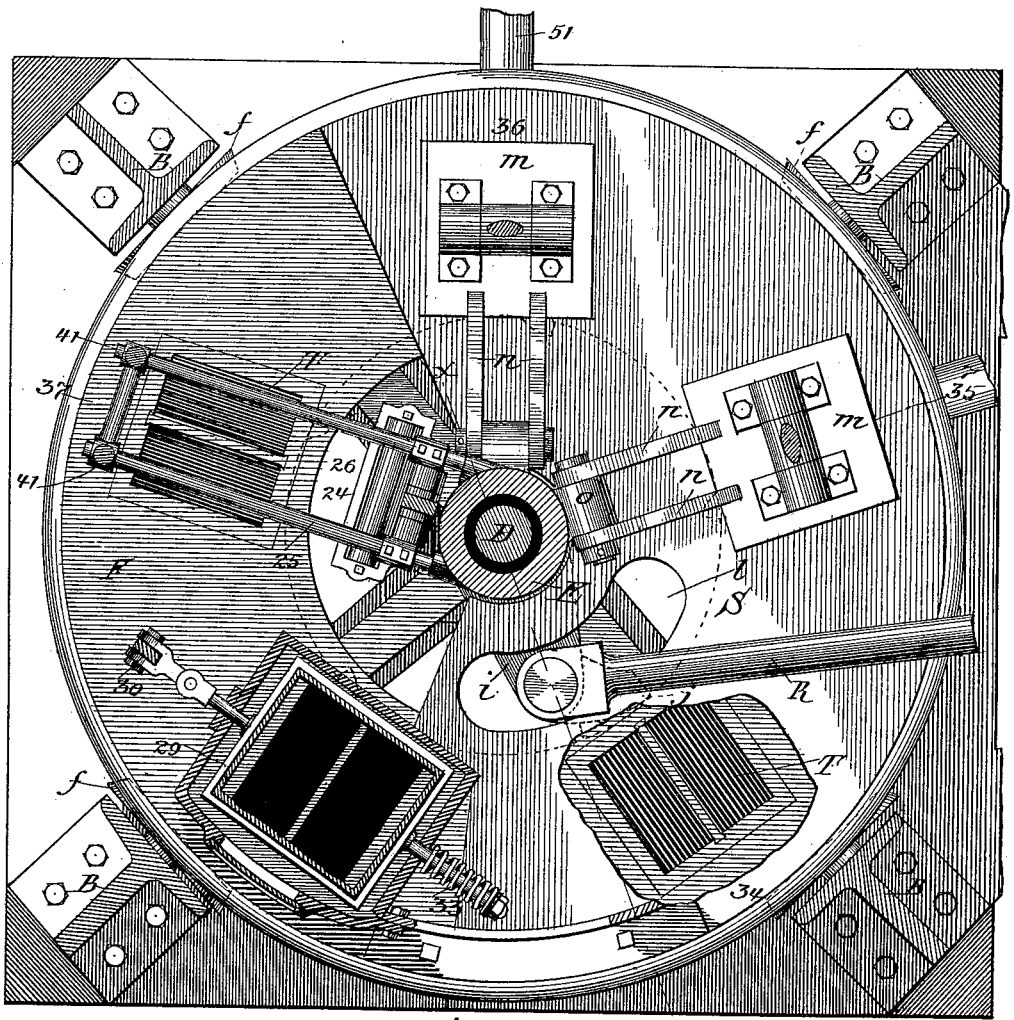
Figure 6:
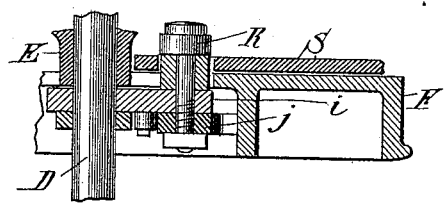

Figure 1 is a side elevation. Fig. 2 is an end elevation. Fig. 3 is a plan. Fig. 4 is a section at line $x\,x$ of Fig. 3. Fig. 5 is a plan of the mold-table, being, in effect, a section of the parts represented taken at line $x\,x$ of Fig. 1. Fig. 6 is a detail, being a section of the parts shown at line $x\,x$ of Fig. 5. Fig. 7 is a section at line $y\,y$ of Fig. 1, showing a plan of the track and bed-plate. Fig. 8 is a detail, showing the agitator. Fig. 9 is a detail, being a side view of the sweep and operating-lever. Fig. 10 is a detail, being a front view of the sweep and lever. Fig. 11 is a detail, being a section through the track at line $x$ of Fig. 7. Fig. 12 is a detail, being a section through the wedge and block. Figs. 5, 8, 9, 10, 11, and 12 are enlarged.

This invention relates to that class of brick-machines in which a revolving mold-table is used, moving intermittently. The leading objects of my improvement are to provide improved means for giving pressure to the brick, both from below and above simultaneously, and to provide improved means for giving movement to the mold-table. In connection with these features there are other improvements in the construction of the machine, all of which are illustrated in the accompanying drawings.

Those things which I claim to be new will be pointed out in the claims.

In the drawings, A represents a bed-plate, which plate is not fully shown in Fig. 1 for want of room.

B B are T-shaped posts bolted to the bed-plate. C is a cap-plate, which is bolted to the upper ends of the posts B. The upper gear is supported on the cap C.

D is a shaft, the lower end of which is located in a socket in $a$, and is secured therein by a set-screw. This shaft passes through a fixed hub at the center of the cap C.

E is a sleeve, the upper end of which is provided with flanges, by means of which the sleeve is bolted to the cap C. This sleeve encircles the shaft D and extends downward, as shown in Fig. 4.

F is the mold-table, supported upon rollers $b$, upon studs which are secured to the posts B.

$c$ is a collar fixed upon the shaft D, upon which collar the hub $d$ of the mold-table rests. The mold-table is provided with a number of mold-boxes, as usual. As shown, there are five, each of which is double.

G are the pressure-plungers, which are constructed in the ordinary manner, and provided with face-plates. The plungers are provided with rollers $e$ at the lower ends, as usual.

H is the track upon which the rollers $e$ travel. This track is inclined at certain points, and portions $f$ of it are made separate from the main part, so that they can be raised in the usual manner when the pressure is given from below. This track is supported on columns I.

J, Fig. 1, is the main driving-shaft.

K is a beveled pinion engaging with the beveled spur-wheel L, which is keyed to the crank-shaft M, the lower end of which shaft rests in the spindle-step $g$.

N is a bearing for the upper end of the crank-shaft M. As shown, this bearing is made in two parts.

O is a curved standard, bolted at its lower end to the bed-plate.

P P are T-bars, bolted at one end to O and at the other end to two of the posts B.

Q is a crank upon the upper end of the shaft M. R is a pitman-rod operated by the crank-shaft M. Its inner end is pivoted to an arm, $i$, which is pivoted upon the shaft D. $j$ is a pawl pivoted to the outer end of the arm $i$, which pawl engages with ratchet-teeth $k$ upon the inside of a circular opening in the mold-table.

S is a counter pressure-plate, in which there is a slot, $l$, to permit the movement of the pin which connects the inner end of the pitman-rod R with the arm $i$. The movement of this pitman-rod and the action of the pawl $j$ upon the ratchet-teeth $k$ gives to the mold-table an intermittent motion.

$m$ are two saddles, to which are secured arms $n$, which arms are pivoted at $o$ to the sleeve E. Each of these saddles is provided with a lining which enters the mold-boxes T. The parts *p q* together form a toggle-joint, the lower end of *q* being hinged to one of the saddles *m*, and *p* being hinged at *r* in a bearing secured to the cap C.

U is a large beveled gear-wheel, which rotates upon the shaft D. This wheel is moved intermittently by means similar to those which give motion to the mold-table.

V is a pitman-rod operated by the crank Q. The inner end of this rod is pivoted to an arm, *s*, which is pivoted upon the shaft D and supported on a collar, *t*. The outer end of this arm *s* is provided with a pawl, *v*, which engages with the ratchet-teeth *u* on the inside of the bevel-wheel U. *w* is a spring which holds the pawl *v* in engagement with the ratchet-teeth.

1 is a shaft, upon the inner end of which is a beveled pinion, 2, which engages with the wheel U.

3 is an eccentric upon the shaft 1.

4 are two arms having large holes in them, through which the shaft 1 passes. The lower ends of these arms are hinged to 5, which is hinged at its lower end to *p* at 6.

The eccentric 3 operates the toggle *p q*, through which pressure is given to the upper side of the brick. The plungers G, through which pressure is given to the under side of the brick, are operated through toggles, (one of which is clearly shown in Fig. 4,) consisting of the two parts 7 8, hinged to each other at 9, 8 being hinged at its lower end, and 7 being provided with trunnions 10, upon which a movable portion, *f*, of the track is supported.

11 is an eccentric on the shaft 1. 12 is a strap around the eccentric. 13 is a connecting-rod connecting the strap 12 with the part 7 of the toggle.

14 is a beveled pinion similar to 2, located on a shaft similar to 1, and provided with eccentrics similar to 3 and 11, through which toggles corresponding with *p q* and 7 8 are operated to give the third pressure.

15 is a beveled wheel corresponding with 2, upon a shaft, 16, corresponding with 1.

17 is an eccentric on the shaft 16, corresponding with 3.

18 is a link extending downward from the strap which encircles the eccentric 17, which link is connected at its lower end with a crank, 19, upon a short shaft, 20, supported in bearings 21.

22 is an arm rigidly secured at its upper end to the shaft 20. Its lower end is provided with a slot, 23.

24 (see Figs. 9 and 10) is a sweep for removing the brick. It is mounted on the guide-rods 25, and is provided with a roller, 26, covered with sheepskin or other suitable material, for the purpose of oiling the plungers. Through the slot in the lower end of the lever 22 passes a pin, 27, the ends of which are in bearings 28 upon the sweep 24.

In Fig. 9 I have shown devices for compensating for wear upon the rods 25, and also a screw for tightening the upper half of the bearing for the roller 26. The inner ends of the rods 25 are supported in the sleeve E.

41 are rods for supporting the outer ends of the sweep-guides 25.

29 is a pivoted hopper. This hopper is moved or agitated by means of a lever and a spring.

30 is the lever, connected at its lower end with the hopper and pivoted at 31 to some point outside of the hopper. The upper end of the lever is provided with a projection, and the lever is moved by means of pins 32, projecting from the bevel-wheel 15 and engaging with said projection. The movement of this lever moves the hopper in one direction and the spring 33 moves it in the other.

That part of the track beneath the point where the mold-boxes are filled is adjustable, so that it can be raised a little, for the purpose of varying the position of the plungers, as may be desirable, in regulating the quantity of clay to be fed to the mold-boxes. This piece of the track 42 is hinged at one end, and is adjustable vertically by means of set-screws, as shown in Fig. 11.

To provide for the wear of the parts which operate the toggle-joint 7 8, and for the purpose of adjusting this joint, I have provided a wedge, 43, beneath the block 44. By loosening the bolts 45 the position of the wedge 42 can be changed at pleasure, thus increasing or lessening the distance from the lowest point of the toggle to the trunnions 10. The wedge is slotted.

A portion of the track 46 is very much inclined, (see Fig. 4,) for the purpose of raising the plungers far enough to lift the brick out from the molds preparatory to their being removed from the table by the sweep.

47 (see Fig. 2) is a shaft corresponding with the shaft 1.

48 and 49 are two eccentrics corresponding with 3 and 11.

50 is a connecting-rod.

51 is the upper part of a toggle-joint, and 52 is the upper part of another toggle-joint.

The operation is as follows: The machine being in motion, clay is fed to the hopper, and passes therefrom to the mold-boxes in the usual manner. The mold-table is moved intermittently through the action of the pitman R, arm *i*, and pawl *j*, acting upon the ratchet-teeth *k* upon the interior of the mold-table. The first pressure is given by the passage of the rollers at the lower end of the plungers over an incline in the track H, which incline is shown in Fig. 1, the first pressure being given at the point indicated by 34. (See Fig. 5.) The second pressure is given at the point marked 35 by means of two toggles, one above and one below. The upper toggle is operated by means of the eccentric 3 upon the shaft 1, which shaft is driven by the wheel U, which engages with the pinion 2, which wheel U is driven intermittently by the pitman-rod V, arm *s*, and pawl *v*, which pawl engages with the ratchet-teeth *u* upon the inside of the wheel U. The lower toggle is operated by the eccentric 11 upon the same shaft, 1. The third pressure is given at the point 36 by means of two toggles operated by a beveled pinion, 14, on a shaft corresponding with 1, and carrying eccentrics corresponding with 3 and 11. The brick are delivered at the point 37 onto a table or belt, which is not shown, by the sweep 24, which slides upon the rods 25, and is moved by the bar 22, operated by the eccentric 17, through the rod 18, crank 19, and shaft 20, the eccentric 17 being on the shaft 16, which is driven by the pinion 15, which engages with the wheel U. The parts are so arranged and the machine so timed that in use the three pressures and the action of the sweep are simultaneous, as well as charging the molds. By removing the screw which holds the shaft D in its socket *a*, and loosening the collars *c t*, the shaft D can be lifted out from the machine, and then the mold-table, the track, and the sleeve E can be readily removed for repairs. This construction is important, and enables the principal parts of the machine to be removed and repaired without taking apart the whole machine. The saddles *m* are in operation raised a little at the proper time to permit the passage of the mold-table when it rotates.

What I claim as new, and desire to secure by Letters Patent, is—

1. In a brick-machine, the combination of a rotating mold-table provided with mold-boxes, one or more toggle-joints located above the table and one or more toggle-joints located below the table, to give pressure to the brick upon two opposite sides, a center shaft, D, a bevel gear-wheel, U, engaging with one or more bevel-pinions, each upon a short shaft rotating in bearings supported by the cap C, eccentrics on each of said shafts, and connecting-rods for operating the toggle-joints, substantially as and for the purposes specified.

2. In a brick-machine, a revolving mold-table provided with mold-boxes and with ratchet-teeth *k* upon the interior, in combination with a shaft, D, arm *i*, pivoted on the shaft D, pawl *j* on the arm *i*, and pitman-rod R, whereby the mold-table will be intermittently rotated, substantially as and for the purposes specified.

3. In a brick-machine, a base-plate, posts B, and cap C, in combination with a center shaft, D, bevel-wheel U, provided with ratchet-teeth *u* upon the interior, arm *s*, pivoted upon the shaft D, pawl *v*, pivoted to the arm *s*, and pitman V, whereby an intermittent rotary motion can be given to the bevel-wheel U, substantially as and for the purposes specified.

4. In a brick-machine, a revolving mold-table provided with mold-boxes, a cap, C, supported upon the posts B, a shaft, 16, supported in bearings upon the cap C, an eccentric on said shaft 16, center shaft, D, bevel-wheel U, provided with ratchets *u*, arm *s*, pawl *v*, pitman V, sweep 24, and connections between the sweep and eccentric, substantially as and for the purposes specified.

5. In a brick-machine, the combination of a crank-shaft, M, two pitman-rods, R V, mold-table F, shaft D, arm *i*, pawl *j*, wheel U, arm *s*, and pawl *v*, substantially as specified.

6. In a brick-machine, a movable hopper, in combination with an agitator consisting of a lever, 30, connected at its lower end with the hopper and operated by means of pins upon a pinion, and a spring, 33, substantially as specified.

WILLIAM LAMPAS GREGG.

Witnesses:
J. R. MASSEY,
FRANK H. MASSEY.